United States Patent
Shen et al.

(10) Patent No.: US 11,537,329 B1
(45) Date of Patent: Dec. 27, 2022

(54) EMULATION TEST SYSTEM FOR FLASH TRANSLATION LAYER AND METHOD THEREOF

(71) Applicant: INNOGRIT TECHNOLOGIES CO., LTD., Shanghai (CN)

(72) Inventors: Wentao Shen, Shanghai (CN); Ke Wei, Shanghai (CN)

(73) Assignee: INNOGRIT TECHNOLOGIES CO., LTD., Shanghai (CN)

( * ) Notice: Subject to any disclaimer, the term of this patent is extended or adjusted under 35 U.S.C. 154(b) by 0 days.

(21) Appl. No.: 17/555,130

(22) Filed: Dec. 17, 2021

(30) Foreign Application Priority Data

Jul. 19, 2021 (CN) .......................... 202110812619.2

(51) Int. Cl.
| | | |
|---|---|---|
| G06F 12/00 | (2006.01) | |
| G06F 3/06 | (2006.01) | |
| G06F 12/02 | (2006.01) | |

(52) U.S. Cl.
CPC ............ G06F 3/0664 (2013.01); G06F 3/064 (2013.01); G06F 3/067 (2013.01); G06F 3/0619 (2013.01); G06F 3/0659 (2013.01); G06F 12/0246 (2013.01); *G06F 2212/7201* (2013.01)

(58) Field of Classification Search
CPC ...... G06F 3/0664; G06F 3/0619; G06F 3/064; G06F 3/0659; G06F 3/067; G06F 12/0246; G06F 2212/7201
USPC ....................................................... 711/154
See application file for complete search history.

(56) References Cited

U.S. PATENT DOCUMENTS

| | | | | |
|---|---|---|---|---|
| 10,860,357 | B1* | 12/2020 | Johnson | .............. G06F 13/4282 |
| 2004/0186946 | A1 | 9/2004 | Lee | |
| 2006/0195675 | A1* | 8/2006 | Arndt | .................. G06F 9/45537 |
| | | | | 711/200 |
| 2011/0010698 | A1 | 1/2011 | Byom et al. | |
| 2012/0166689 | A1 | 6/2012 | Lee | |
| 2017/0177233 | A1 | 6/2017 | Delaney et al. | |
| 2018/0074994 | A1* | 3/2018 | Anumula | ............ G06F 15/7889 |

FOREIGN PATENT DOCUMENTS

| | | | | | |
|---|---|---|---|---|---|
| CA | 2971913 | C | * | 4/2019 | ......... G06F 12/0238 |
| CN | 103543955 | A | | 1/2014 | |
| CN | 109445691 | A | | 3/2019 | |
| CN | 109710187 | A | | 5/2019 | |
| JP | 2005500618 | A | * | 1/2005 | |
| KR | 20210125477 | A | * | 1/2021 | |

\* cited by examiner

*Primary Examiner* — Mardochee Chery
(74) *Attorney, Agent, or Firm* — Womble Bond Dickinson (US) LLP

(57) ABSTRACT

The present disclosure relates to an emulation test system for flash translation layer and a method thereof, the system comprising a network block device, a virtual hardware accelerator, a flash translation layer module, and a virtual flash memory based on the network block device, wherein the network block device is configured to receive and forward test information, the test information including a read instruction and/or a write instruction and data to be written; the virtual hardware accelerator is configured to allocate the test information to each thread of the virtual hardware accelerator and perform virtual hardware acceleration on the flash translation layer module; and the flash translation layer module is configured to operate the virtual flash memory based on the test information to obtain an operation result.

10 Claims, 5 Drawing Sheets

EMULATION TEST SYSTEM FOR FLASH TRANSLATION LAYER AND METHOD THEREOF

CROSS-REFERENCE TO RELATED APPLICATION

The present application is based upon and claims the benefits of a priority of Chinese Patent Application No. 202110812619.2, filed on Jul. 19, 2021, the entire contents of which are incorporated herein by reference.

TECHNICAL FIELD

The present disclosure relates to the field of test technology, and in particular to an emulation test system for flash translation layer and a method thereof.

BACKGROUND

The Flash Translation Layer (FTL) algorithm is the core of a SSD (Solid State Disk) firmware. In order to improve the efficiency of development and verification of a FTL algorithm, a verification environment is required first. A current firmware verification environment includes a SSD master (e.g., an embedded controller), NAND Flash particles, DDR, PCIE, DStream and other devices. These hardware products are generally expensive, and some of them consumable. For example, NAND Flash only allows limited times of read/write and erase operations. They also take long to start up and are less stable in use. Further, in FTL design, FTL software needs to be designed to match the hardware. Hence, the relevant technology is often designed and developed on an embedded controller working as a platform. However, these factors will directly reduce the development efficiency and increase the development cost of the SSD firmware.

SUMMARY

According to an aspect of the present disclosure, there is provided an emulation test system for flash translation layer, the system comprising a network block device, a virtual hardware accelerator, a flash translation layer module, and a virtual flash memory based on the network block device, wherein the network block device is configured to receive and forward test information, the test information including a write instruction and data to be written and/or a read instruction;

the virtual hardware accelerator, connected to the network block device and the flash translation layer module, is configured to allocate the test information to each thread of the virtual hardware accelerator and perform virtual hardware acceleration on the flash translation layer module; and the flash translation layer module, connected to the virtual flash memory and the network block device, is configured to operate the virtual flash memory based on the test information to obtain an operation result, wherein based on the test information including the read instruction, a read operation result is returned to the network block device through the virtual hardware accelerator, or based on the test information including the write instruction, a write operation result is returned to the network block device through the flash translation layer module.

In a possible implementation, the network block device includes a network block device client and a network block device server, the network block device client is configured to receive a test request and parse the test request to obtain the test information; and the network block device server is configured to, based on a type of the test information, enqueue an instruction in the test information to forward the instruction to the virtual hardware accelerator and copy the data to be written to the virtual hardware accelerator.

In a possible implementation, the virtual hardware accelerator and the flash translation layer module include one or more threads.

In a possible implementation, based on the test information including the write instruction and data to be written, the flash translation layer module is further configured to:

request for a storage space from the virtual flash memory;

perform a translation from a logical address to a physical address; and write the data to be written to the requested storage space based on the resulted physical address and return a write operation result to the network block device.

In a possible implementation, based on the test information including the read instruction, the flash translation layer module is further configured to:

perform a translation from a logical address to a physical address; and read data from the virtual flash memory based on the physical address resulted from the translation and return a read operation results to the virtual hardware accelerator.

According to an aspect of the present disclosure, there is provided an emulation test method for flash translation layer, the method comprising:

generating a network block device, a virtual hardware accelerator, a flash translation layer module, and a virtual flash memory based on the network block device;

receiving and forwarding test information by the network block device, the test information including a write instruction and data to be written and/or a read instruction;

by the virtual hardware accelerator, allocating the test information to each thread of the virtual hardware accelerator and performing a virtual hardware acceleration on the flash translation layer module; and by the flash translation layer module, operating the virtual flash memory based on the test information to obtain an operation result, wherein based on the test information including the read instruction, a read operation result is returned to the network block device through the virtual hardware accelerator, or based on the test information including the write instruction, a write operation result is returned to the network block device through the flash translation layer module.

In a possible implementation, the network block device includes a network block device client and a network block device server, the method further comprises:

by the network block device client, receiving a test request and parsing the test request to obtain the test information; and by the network block device server, based on a type of the test information, enqueuing an instruction in the test information to forward the instruction to the virtual hardware accelerator and copying the data to be written to the virtual hardware accelerator.

In a possible implementation, based on the test information including a write instruction and data to be written, the method further comprises:

performing, by the flash translation layer module, operations of:

requesting for a storage space from the virtual flash memory;

a translation from a logical address to a physical address; and writing the data to be written to the requested storage space based on the resulted physical address and returning a write operation result to the network block device.

In a possible implementation, based on the test information including the read instruction, the method further comprises:

performing, by the flash translation layer module, operations of:

a translation from a logical address to a physical address; and reading data from the virtual flash memory based on the physical address resulted from the translation and returning a read operation result to the virtual hardware accelerator.

In a possible implementation, the virtual hardware accelerator and the flash translation layer module include one or more threads.

According to an aspect of the present disclosure, there is provided an electronic apparatus comprising: a processor; a memory storing processor-executable instructions; wherein the processor is configured to call the instructions stored in the memory to perform the afore-described method.

According to an aspect of the present disclosure, there is provided a computer readable storage medium storing computer program instructions, wherein the computer program instructions implement the method as being executed by a processor.

With the above system, by receiving and forwarding test information by the network block device, allocating the test information to each thread of the virtual hardware accelerator and performing a virtual hardware acceleration on the flash translation layer module by the virtual hardware accelerator, operating, by the flash translation layer module, the virtual flash memory based on the test information to obtain an operation result, wherein based on the test information including the read instruction, a read operation result is returned to the network block device through the virtual hardware accelerator, or based on the test information including the write instruction, a write operation result is returned to the network block device through the flash translation layer module, embodiments of the present disclosure enable the flash translation layer to be tested, designed, and developed on the system, thereby locating critical paths and analyzing the flash memory translation performance. As such, the present disclosure provides good detection capability for abnormalities such as null pointer access in the FTL, improving design stability and development efficiency of the FTL.

It should be understood that the above general description and the subsequent detailed description are exemplary and explanatory only, and are not intended to limit the present disclosure. Additional features and aspects of the present disclosure will become clear based on the following detailed description of exemplary embodiments with reference to the accompanying drawings.

BRIEF DESCRIPTION OF THE DRAWINGS

The accompanying drawings herein are incorporated into and form a part of the description, which illustrate embodiments in compliance with the present disclosure and are used in conjunction with the description to illustrate the technical solutions of the present disclosure.

DETAILED DESCRIPTION

Figure 1:
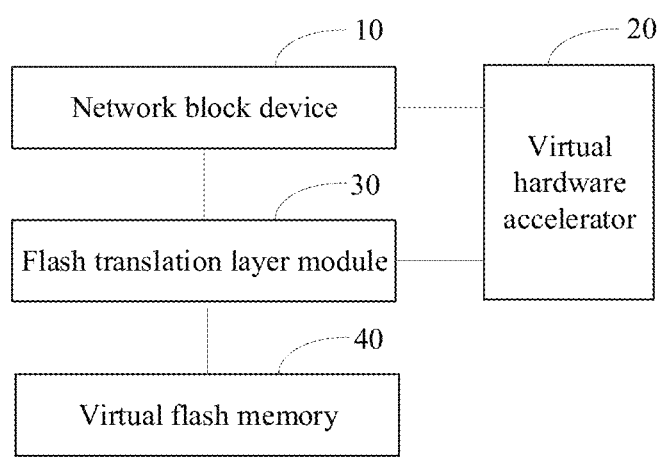
FIG. 1 is a block diagram of an emulation test system for flash translation layer according to an embodiment of the present disclosure.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

Various exemplary embodiments, features and aspects of the present disclosure are described in detail below with reference to the accompanying drawings. Identical reference signs in the accompanying drawings indicate functionally identical or similar components. Although various aspects of the embodiments are illustrated in the accompanying drawings, it is not necessary to draw the accompanying drawings to scale unless specifically noted.

In the description of the present disclosure, it is appreciated that a directional or positional relationship indicated by the terms "length," "width," "upper" "lower", "front", "rear", "left", "right", "vertical", "horizontal", "top", "bottom", "inner", "outer" and the like is a directional or positional relationship based on the contents shown by the accompanying drawings. The above terms are used in order to facilitate and simplify the description of the present disclosure, not to indicate or imply that the referred device or element must have a particular orientation, be constructed and operate in a particular orientation, and therefore are not to be construed as a limitation to the present disclosure.

Herein the terms "first" and "second" are used for descriptive purpose only and are not to be construed as indicating or implying relative importance or implicitly specifying the amount of the referred technical feature. Thus, features limited with "first" and "second" may explicitly or implicitly include one or more those features. In the description of the present disclosure, "a plurality of" means two or more, unless otherwise expressly and specifically limited.

Unless otherwise expressly specified and limited, herein the terms "mount," "connect," "attach" "fix" and the like shall be interpreted in a broad sense. For example, a connection may be a fixed connection or a removable connection or an integral connection; a mechanical connection or an electrical connection; a direct connection or an indirect connection realized by an intermediate medium; a connection within two elements or an interactive relationship between two elements. For those of ordinary skill in the art, the specific meaning of the above terms may be understood on a case-by-case basis.

The word "exemplary" is used here exclusively to mean "used as an example, embodiment, or illustrative". Any embodiment illustrated herein as "exemplary" need not be construed as superior or better than other embodiments.

Herein the term "and/or" describes a relation between associated objects and indicates three possible relations. For example, the phrase "A and/or B" indicates a case where only A is present, a case where A and B are both present, and a case where only B is present. In addition, the term "at least one" herein indicates any one of a plurality or a random combination of at least two of a plurality. For example, including at least one of A, B and C means including any one or more elements selected from a group consisting of A, B and C.

Numerous details are given in the following examples for the purpose of better explaining the present disclosure. It should be understood by a person skilled in the art that the present disclosure may still be realized even without some of those details. In some of the examples, methods, means, units and circuits that are well known to a person skilled in the art are not described in detail so that the principle of the present disclosure become apparent.

In an embedded controller-based SSD, the FTL is a core component of the firmware. It serves to maintain a mapping relationship between the host logical device address (LDA) and the flash physical device address (PDA). When the host performs a read/write operation on the SSD, the FTL looks for a corresponding flash address based on the mapping relationship. Therefore, the FTL is required to implement an efficient and superior algorithm to manage this mapping relationship, which determines the properties of the SSD such as the performance, the stability, the lifetime and the like. In addition, in order to improve performance of the SSD, a corresponding hardware accelerator is usually designed for the embedded controller to overcome bottlenecks of some critical paths. This requires a matching design between the software and the hardware for the FTL. Accordingly, the FTL software may be designed on the embedded controller itself as a platform, which is the most direct manner. But for cost control, a CPU in the embedded controller may not provide additional capacity to support debugging and analysis of the FTL software. Moreover, the related technology may not detect abnormalities such as null pointer access, which usually cause the firmware to crash. The Related technology analyzes FTL performance bottlenecks only through debugging codes and may not quantitatively analyze the performance of the FTL algorithm. The embodiments of the present disclosure provide an emulation test system flash translation layer to perform a low-cost and high-efficiency test for the FTL when the FTL works in cooperation with a hardware accelerator. The present disclosure is thus capable of addressing special abnormalities such as null pointer access that cannot be detected in the development based on the embedded controller. Second, the emulation test system allows analysis of the FTL algorithm with the help of other test and analysis tools, such as IO test software (FIO, etc.) as well as profile tools provided by GCC, and so on.

Referring to FIG. 1, FIG. 1 is a block diagram of an emulation test system for flash translation layer according to an embodiment of the present disclosure.

As shown in FIG. 1, the system includes a network block device 10, a virtual hardware accelerator 20, a flash translation layer module 30, and a virtual flash memory 40 based on the network block device 10, wherein the network block device (NBD) 10 is configured to receive and forward the test information, the test information including a write instruction and data to be written and/or a read instruction;

the virtual hardware accelerator 20, connected to the network block device 10 and the flash translation layer module 30, is configured to allocate the test information to each thread of the virtual hardware accelerator 20 and perform virtual hardware acceleration on the flash translation layer module 30; and the flash translation layer module 30, connected to the virtual flash memory 40 and the network block device 10, is configured to operate the virtual flash memory 40 based on the test information to obtain an operation result, wherein based on the test information including the read instruction, a read operation result is returned to the network block device 10 through the virtual hardware accelerator 20, or based on the test information including the write instruction, a write operation result is returned to the network block device 10 through the flash translation layer module 30.

With the above system, by receiving and forwarding test information by the network block device, allocating the test information to each thread of the virtual hardware accelerator and performing virtual hardware acceleration on the flash translation layer module by the virtual hardware accelerator, operating, by the flash translation layer module, the virtual flash memory based on the test information to obtain an operation result, wherein based on the test information including a read instruction, a read operation result is returned to the network block device through the virtual hardware accelerator, or based on the test information including a write instruction, a write operation result is returned to the network block device through the flash translation layer module, the embodiment of the present disclosure enables the flash translation layer to be tested, designed, and developed on the system, thereby locating critical paths and analyzing the flash memory translation performance. As such, the present disclosure provides good detection capability for abnormalities such as null pointer access in the FTL, improving design stability and development efficiency of the FTL.

The emulation test system for flash translation layer according to an embodiment of the present disclosure may be implemented based on various platform architectures. For example, based on an X86 platform, an embodiment of the present disclosure proposes a virtual front-end (network block device), a virtual back-end (virtual flash memory), and a hardware accelerator module designed in the X86 platform based on the way the firmware interacts with the host and flash memory in the embedded controller. Thus, a virtual SSD emulation system based on the X86 platform is constituted based on these virtual hardware modules combined with the FTL software in the embedded controller firmware.

The network block device 10 according to an embodiment of the present disclosure may receive test information from a host (e.g., a computer or another electronic apparatus with a Linux® computer system or a Unix® computer system). In an example, the NBD may be provided on the host; operation with the network block device and the computer requires a server mode and a client mode. Something referred to as a "device node" is maintained on the server, which is usually a hard disk, a disk array, or a file type commonly referred to as a disk image. The server runs a small piece of software called a background program that allows the client to access the device node from the server and install it locally. Accessing to the device node is just like accessing to any other disk drive from the perspective of a client computer.

The embodiment of the present disclosure does not limit specific implementation of the NBD. Those skilled in the art may refer to the implementation in a relevant technology. The embodiment of the present disclosure implements the test of the FTL through the NBD, replacing the original front-end interface of an nvme interface with a NBD interface. This, for a testing tool under linux such as a FIO, is equivalent to translating an operation on an nvme apparatus to an operation on the NBD apparatus. This allows observing the operating state of the FTL module during a read and write test, including presence of abnormality (e.g., null pointer access) and performance data, thus solving the problem of a high cost and a low efficiency of performing a FTL test by a SSD.

The embodiment of the present disclosure may simulate a flash memory by a NBD-based large file to obtain the virtual flash memory 40. The operation on the flash memory may be stimulated by read and write operations on the large file, thereby reducing the testing cost and improving the testing efficiency.

The virtual hardware accelerator 20 according to an embodiment of the present disclosure may improve the functions such as data transfer efficiency, fast update of a mapping table, fast lookup, and more efficient memory management, by simulating the functions of the hardware accelerator through a software. Exemplarily, the virtual hardware accelerator module may set a queue of a plurality of threads to transfer commands and data, for the purpose of realizing communications between modules. Meanwhile, it simulates the core functions of the hardware accelerator by means of a corresponding algorithm. The embodiment of the present disclosure does not limit the specific implementation of the virtual hardware accelerator 20. Those skilled in the art may refer to the implementation in a relevant technology.

The flash translation layer module 30 according to an embodiment of the present disclosure may be obtained by the FTL software of the SSD-based controller. For example, the FTL software in the embedded controller of the SSD may be migrated to the system to test the FTL module.

In a possible implementation, the virtual hardware accelerator 20 and the flash translation layer module 30 may include one or more threads to simulate a software design of a single-core to a multi-core CPU, thereby improving its adaptability and flexibility.

Figure 2:
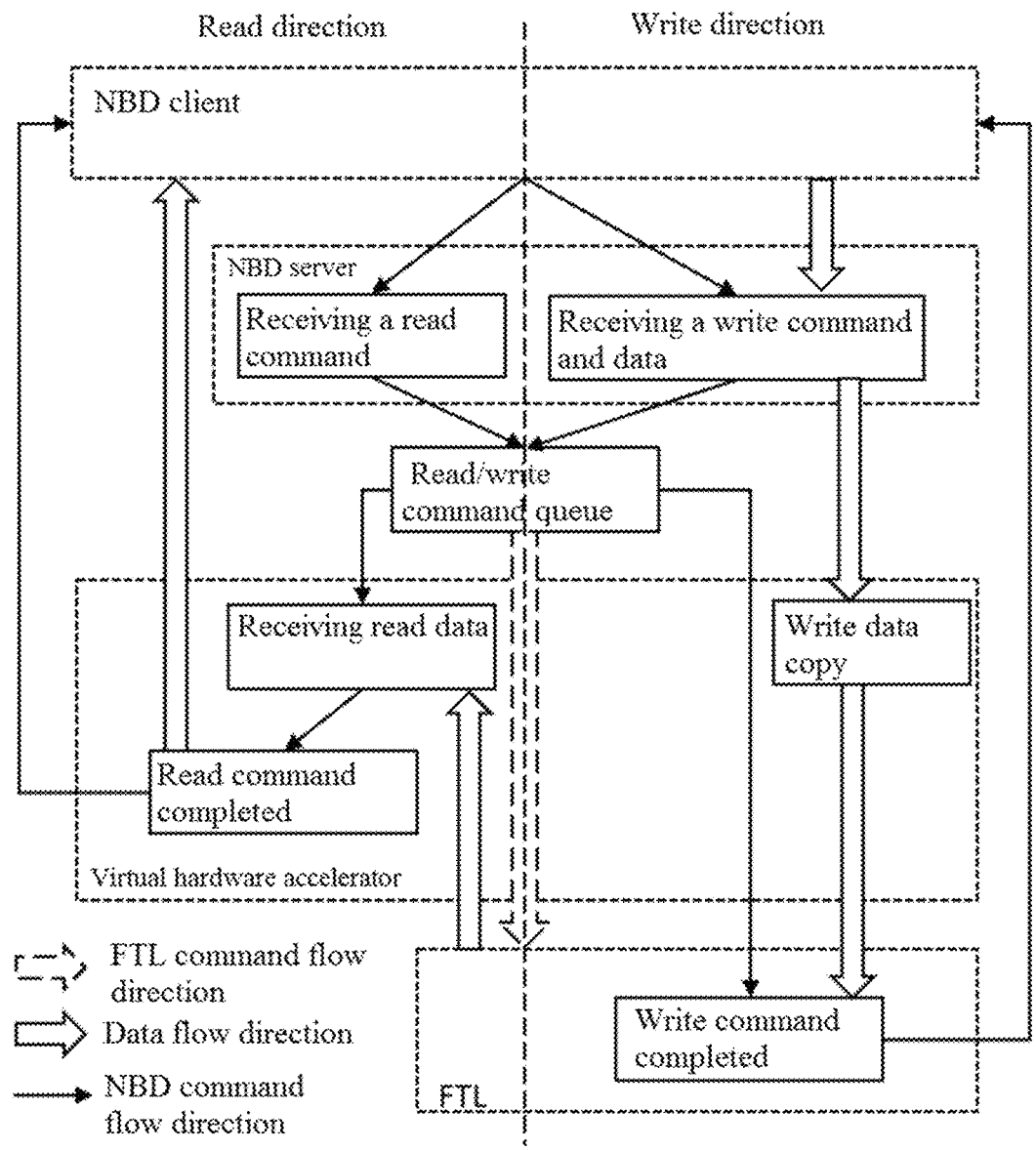
FIG. 2 is a schematic diagram of an emulation test system for flash translation layer according to an embodiment of the present disclosure.

Referring to FIG. 2, FIG. 2 is a schematic diagram of an emulation test system for flash translation layer according to an embodiment of the present disclosure.

In a possible implementation, as shown in FIG. 2, the network block device 10 includes a network block device client 110 and a network block device server 120, wherein
the network block device client 110 is configured to receive a test request and parse the test request to obtain the test information; and
the network block device server 120 is configured to, based on a type of the test information, enqueue an instruction in the test information to forward the instruction to the virtual hardware accelerator and copy the data to be written to the virtual hardware accelerator.

In an example, the network block device client 110 and the network block device server 120 combined are equivalent to the nvme interface hardware in an actual SSD, i.e., the front end of the controller. The client performs operations such as receiving read and write requests from the host. The server forwards the requests received by the client from the host to the internal FTL. The server may be deemed as a forwarding interface for commands and data.

In an example, as shown in FIG. 2, during the emulation, the software process creates a NBD-based real physical disk symbol. When the host transmits read and write instructions to this disk symbol, the NBD server receives these read and write commands and forwards them to a virtual hardware accelerator thread. Then the hardware accelerator thread converts the command of the host into a FTL command, and allocates the FTL command to the FTL module for processing. Meanwhile, the hardware accelerator thread transmits read and write data to the FTL module. The back-end module (the virtual flash 40) only communicates with the FTL module and performs a corresponding file read and write operation upon receiving the read and write command from the FTL module. The hardware accelerator module performs a completion response after the read data transmission is completed; and the FTL module performs a completion response after the write data transmission is completed, so that the response speed is improved.

With the emulation test system for flash translation layer, the embodiment of the present disclosure is capable of directly performing an emulation analysis of the function and the performance of the SSD core component FTL with the help of a testing tool.

In a possible implementation, based on the test information including a write instruction and data to be written, the flash translation layer module 30 is further configured to:
request for a storage space from the virtual flash memory 40;
perform a translation from a logical address to a physical address; and
write the data to be written to an requested storage space based on the resulted physical address and return a write operation result to the network block device 10.

In a possible implementation, based on the test information including a read instruction, the flash translation layer module 30 is further configured to:
perform a translation from a logical address to a physical address; and
read data from the virtual flash memory 40 based on the physical address resulted from the translation and return a read operation result to the virtual hardware accelerator 20.

The embodiment of the present disclosure does not limit the method for address translation of the FTL and does not limit the method for reading or writing data. Those skilled in the art may refer to the implementation in a relevant technology.

The embodiment of the present disclosure makes it easy to detect special abnormality in the FTL software, such as null pointer access, thereby improving FTL design stability. Since the system has a physical device block, various test examples may be implemented like a real SSD, thereby obtaining the FTL module test information from statistics, so as to locate a key path in the software, analyze and optimize the FTL performance. For example, the host read and write IO path is a key component of the firmware because it affects the final performance of the SSD. This path is composed of many function interfaces, of which information such as calling frequency and execution time may be analyzed by a GCC profile tool, making it possible to optimize the code in a targeted manner to reduce the execution time of the firmware on the IO path, thereby eventually improving the read and write performance of the firmware. Based on the modular design of the system, it is possible to directly design and develop the FTL on the system and directly transplant the FTL to the embedded controller after a functional and performance verification, thereby improving the development efficiency.

The emulation test system for flash translation layer according to an embodiment of the present disclosure may be implemented based on the X86 platform. Therefore, the system may be tested and analyzed with the help of a conventional testing tool for a SSD. In addition, the system has a low coupling between modules based on the modular design, making it easy to transplant the FTL software from the embedded controller development environment to the system, and vice versa. At the same time, when the design of the hardware accelerator varies, only the virtual hardware accelerator module needs to be modified, allowing high flexibility and improving the test efficiency.

Figure 3:
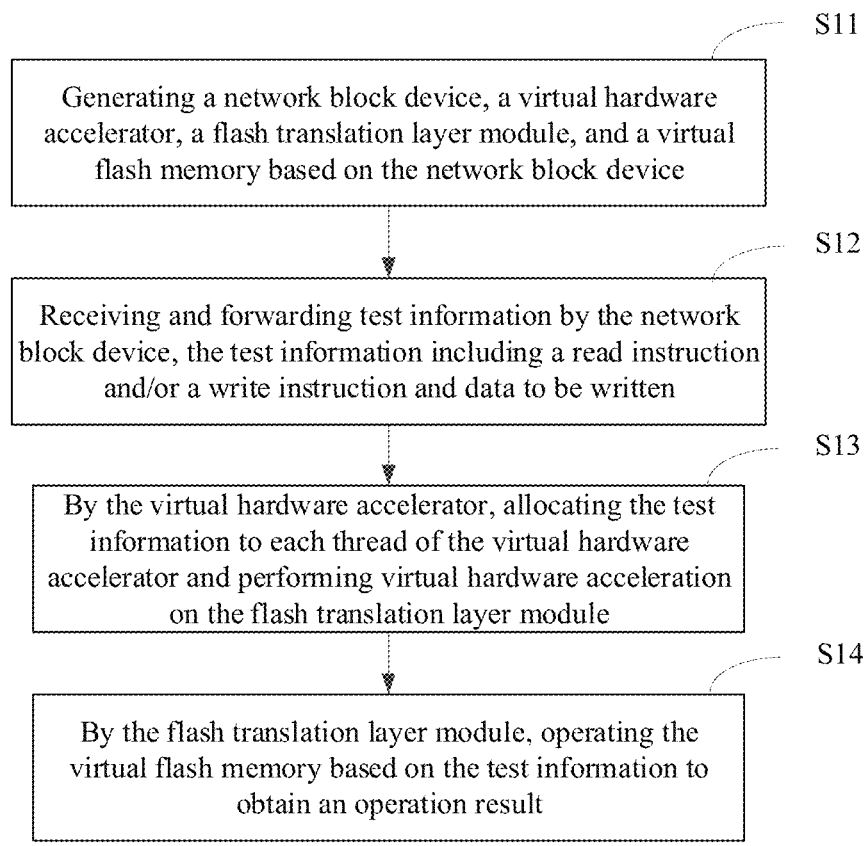
FIG. 3 is a flowchart of an emulation test system for flash translation layer according to an embodiment of the present disclosure.

Referring to FIG. 3, FIG. 3 is a flowchart of an emulation test system for flash translation layer according to an embodiment of the present disclosure.

As shown in FIG. 3, the method comprises:

Step S11, generating a network block device 10, a virtual hardware accelerator 20, a flash translation layer module 30, and a virtual flash memory 40 based on the network block device 10;

Step S12, receiving and forwarding test information by the network block device 10, the test information including a write instruction and data to be written and/or a read instruction;

Step S13, allocating the test information to each thread of the virtual hardware accelerator 20 and performing a virtual hardware acceleration on the flash translation layer module 30, by the virtual hardware accelerator 20;

Step S14, operating, by the flash translation layer module 30, the virtual flash memory 40 based on the test information to obtain an operation result, wherein based on the test information including the read instruction, a read operation result is returned to the network block device 10 through the virtual hardware accelerator 20, or based on the test information including the write instruction, a write operation result is returned to the network block device 10 through the flash translation layer module 30.

By the above method, by receiving and forwarding test information by the network block device, allocating the test information to each thread of the virtual hardware accelerator and performing a virtual hardware acceleration on the flash translation layer module by the virtual hardware accelerator, operating, by the flash translation layer module, the virtual flash memory based on the test information to obtain an operation result, wherein based on the test information including the read instruction, a read operation result is returned to the network block device through the virtual hardware accelerator, or based on the test information including the write instruction, a write operation result is returned to the network block device through the flash translation layer module, the embodiment of the present disclosure enables the flash translation layer to be tested, designed, and developed on the system, thereby locating critical paths and analyzing the flash memory translation performance. As such, the present disclosure provides good detection capability for abnormalities such as null pointer access in the FTL, improving design stability and development efficiency of the FTL.

In a possible implementation, the network block device 10 includes a network block device client 110 and a network block device server 120, the method further comprises:

receiving a test request and parsing the test request to obtain the test information, by the network block device client 110; and by the network block device server 120, based on a type of the test information, enqueuing an instruction in the test information to forward the instruction to the virtual hardware accelerator and copying the data to be written to the virtual hardware accelerator.

In a possible implementation, based on the test information including a write instruction and data to be written, the method further comprises:

performing, by the flash translation layer module 30, the following operations:

requesting for a storage space from the virtual flash memory 40;

a translation from a logical address to a physical address; and writing the data to be written to the requested storage space based on an resulted physical address and returning a write operation result to the network block device 10.

In a possible implementation, based on the test information including a read instruction, the method further comprises:

performing, by the flash translation layer module 30, the following operations:

performing a translation from a logical address to a physical address; and reading data from the virtual flash memory 40 based on a physical address resulted from the translation and returning a read operation result to the virtual hardware accelerator 20.

In a possible implementation, the virtual hardware accelerator 20 and the flash translation layer module 30 include one or more threads.

It is understood that various embodiments of the present disclosure mentioned herein may be combined with one another to form a combined embodiment, without departing from the logics of the principles, which will not be further specified due to limited space. Those skilled in the art understand that the specific order of execution of the steps in a specific implementation of the above method should be determined by the function and possible internal logics thereof.

It should be noted that the emulation test method for flash translation layer is a method corresponding to the afore-described emulation test system for flash translation layer, the details of which may refer to the foregoing description of the system and will not be repeated herein.

The host according to an embodiment of the present disclosure may be an electronic apparatus which may be provided as a terminal, a server, or an apparatus in another form.

Figure 4:
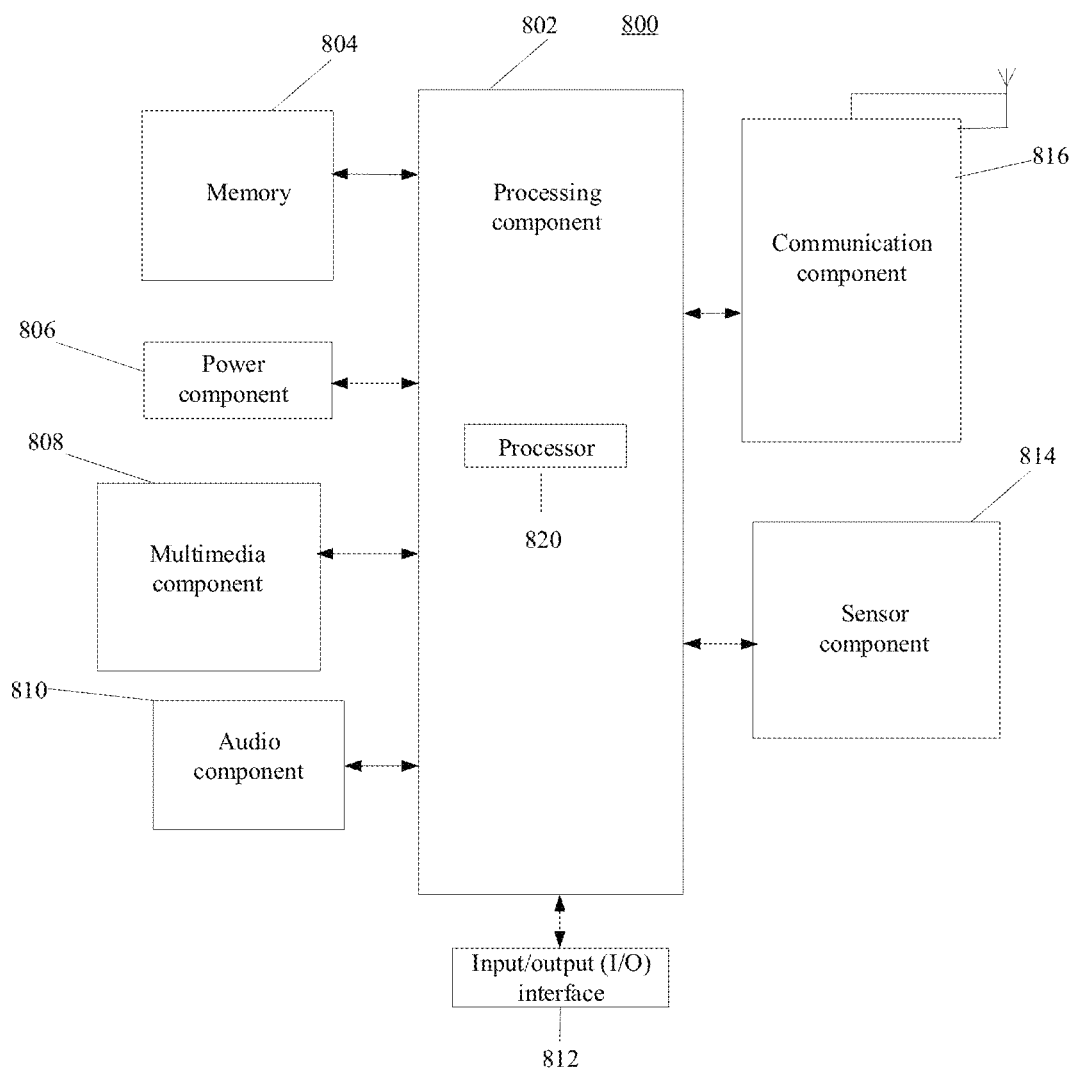
FIG. 4 is a block diagram of an electronic apparatus according to an embodiment of the present disclosure.

Referring to FIG. 4, FIG. 4 is a block diagram of an electronic apparatus according to an embodiment of the present disclosure.

For example, the electronic apparatus 800 may be terminals such as a cell phone, a computer, a digital broadcast terminal, a messaging device, a game console, a tablet device, a medical device, a fitness device, or a personal digital assistant.

Referring to FIG. 4, the electronic apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls the overall operation of the electronic apparatus 800, such as operations associated with display, telephone call, data communication, camera operation, and recording operation. The processing component 802 may include one or more processors 820 to execute instructions to complete all or some of the steps of the method described above. In addition, the processing component 802 may include one or more modules that facilitate an interaction between the processing component 802 and other components. For example, the processing component 802 may include a multimedia module to facilitate the interaction between the multimedia component 808 and the processing component 802.

The memory 804 is configured to store various types of data to support operations at the electronic apparatus 800. Examples of such data include instructions for any application or method, contact data, phonebook data, messages, pictures, videos and the like for operating on the electronic apparatus 800. The memory 804 may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory disk or an optical disk.

The power supply component 806 provides power to various components of the electronic apparatus 800. The power supply component 806 may include a power management system, one or more power supplies, and other components associated with generating, managing, and allocating power for the electronic apparatus 800.

The Multimedia component 808 includes a screen that provides an output interface between the electronic apparatus 800 and a user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touching, swiping, and gestures on the touch panel. The touch sensors may not only sense boundaries of the touching or swiping action, but also detect the duration and pressure associated with the touching or swiping action. In some embodiments, the multimedia component 808 includes a front-facing camera and/or a rear-facing camera. The front camera and/or rear camera may receive external multimedia data when the electronic apparatus 800 is in an operating mode, such as a shooting mode or a video mode. Each front camera and rear camera may be a fixed optical lens system or have a focal length and optical zoom capability.

The audio component 810 is configured to output and/or input audio signals. For example, the audio component 810 includes a microphone (MIC), when the electronic apparatus 800 is in an operating mode, for example, a calling mode, a recording mode, or a voice recognition mode, configured to receive external audio signals. The received audio signal may be further stored in memory 804 or sent via communication component 816. In some embodiments, the audio component 810 further includes a speaker for outputting audio signals.

The I/O interface 812 provides an interface between the processing component 802 and a peripheral interface module which may be a keypad, a click wheel, a button, and the like. These buttons may include but are not limited to a home button, a volume button, a start button, and a lock button.

The sensor component 814 includes one or more sensors for providing status assessment of various aspects of the electronic apparatus 800. For example, the sensor component 814 may detect an open/closed state of the electronic apparatus 800 and a relative positioning of the component, for example, the component is a display and a keypad of the electronic apparatus 800. The sensor component 814 may also detect a change in position of the electronic apparatus 800 or a component of the electronic apparatus 800, presence or absence of the user's contact with the electronic apparatus 800, orientation of the electronic apparatus 800 or acceleration/deceleration and temperature changes of the electronic apparatus 800. The sensor component 814 may include a proximity sensor configured to detect the presence of a nearby object in the absence of any physical contact. The sensor component 814 may also include a light sensor, for example, a complementary metal oxide semiconductor (CMOS) or a charge coupled device (CCD) image sensor for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication between the electronic apparatus 800 and other devices by wired or wireless means. The electronic apparatus 800 may have access to a wireless network based on a communication standard, for example, a wireless network (WiFi), a second generation mobile communication technology (2G) or a third generation mobile communication technology (3G), or a combination thereof. In an exemplary embodiment, the communication component 816 receives broadcast signals or broadcast-related information from an external broadcast management system via a broadcast channel. In an exemplary embodiment, the communication component 816 further comprises a near-field communication (NFC) module to facilitate a short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the electronic apparatus 800 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic components for performing the methods described above.

In exemplary embodiments, a non-volatile computer readable storage medium, such as a memory 804 including computer program instructions, is also provided. The computer program instructions may be executed by a processor 820 of the electronic apparatus 800 to accomplish the above method.

Figure 5:
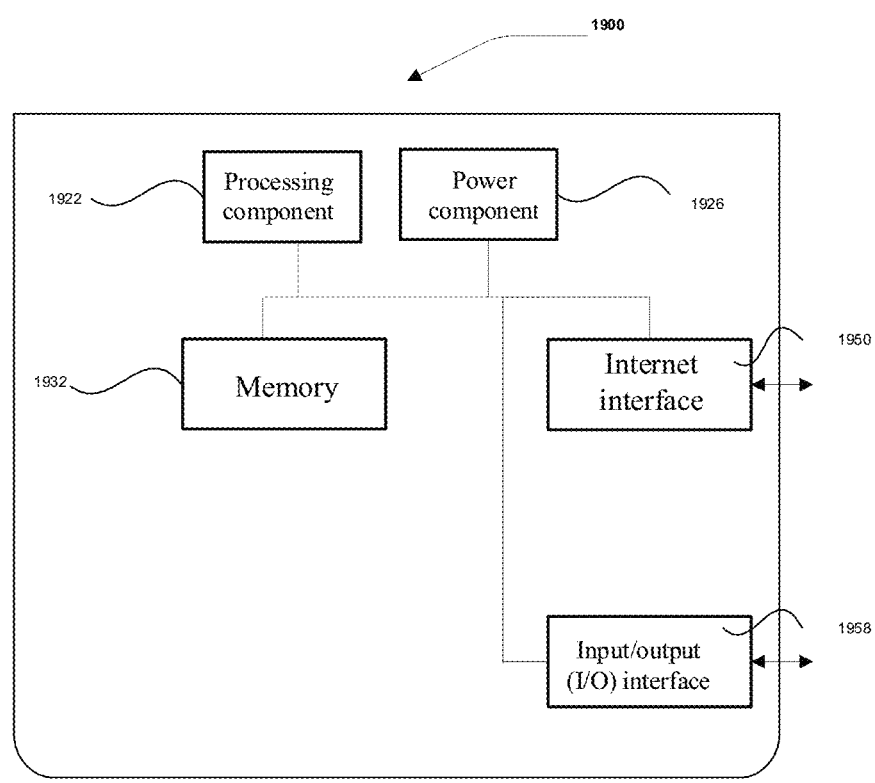
FIG. 5 is a block diagram of an electronic apparatus according to an embodiment of the present disclosure.

Referring to FIG. 5, FIG. 5 is a block diagram of an electronic apparatus according to an embodiment of the present disclosure.

For example, an electronic apparatus 1900 may be provided as a server. Referring to FIG. 5, the electronic apparatus 1900 includes a processing component 1922 which further includes one or more processors, and a memory resource represented by a memory 1932 for storing instructions executable by the processing component 1922, for example, applications. The applications stored in the memory 1932 may include one or more modules each corresponding to a set of instructions. In addition, the processing component 1922 is configured to execute the instructions to perform the method described above.

The electronic apparatus 1900 may also include a power component 1926 configured to perform power management of the electronic apparatus 1900, a wired or wireless network interface 1950 configured to connect the electronic apparatus 1900 to a network, and an input-output (I/O) interface 1958. The electronic apparatus 1900 may operate, for example, a Microsoft Server operating system (Windows Server™), a GUI-based operating system from Apple (Mac OS X™), a multi-user multi-process computer operating system (Unix™), a free and open source Unix-like operating system (Linux™), an open source Unix-like operating system (FreeBSD™) or the similar, based on the operating system stored in the memory 1932.

In exemplary embodiments, there is also provided a non-volatile computer readable storage medium, for example, a memory 1932 including computer program instructions which may be executed by a processing component 1922 of the electronic apparatus 1900 to accomplish the method described above.

The present disclosure may be implemented by a system, a method, and/or a computer program product. The computer program product may include a computer readable storage medium having computer readable program instructions for causing a processor to carry out the aspects of the present disclosure stored thereon.

The computer readable storage medium can be a tangible device that can retain and store instructions used by an instruction executing device. The computer readable storage medium may be, but not limited to, e.g., electronic storage device, magnetic storage device, optical storage device, electromagnetic storage device, semiconductor storage device, or any proper combination thereof. A non-exhaustive list of more specific examples of the computer readable storage medium includes: portable computer diskette, hard disk, random access memory (RAM), read-only memory (ROM), erasable programmable read-only memory (EPROM or Flash memory), static random access memory (SRAM), portable compact disc read-only memory (CD-ROM), digital versatile disk (DVD), memory stick, floppy disk, mechanically encoded device (for example, punch-cards or raised structures in a groove having instructions recorded thereon), and any proper combination thereof. A computer readable storage medium referred herein should not to be construed as transitory signal per se, such as radio waves or other freely propagating electromagnetic waves, electromagnetic waves propagating through a waveguide or other transmission media (e.g., light pulses passing through a fiber-optic cable), or electrical signal transmitted through a wire.

Computer readable program instructions described herein can be downloaded to individual computing/processing devices from a computer readable storage medium or to an external computer or external storage device via network, for example, the Internet, local area network, wide area network and/or wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium in the respective computing/processing devices.

Computer readable program instructions for carrying out the operations of the present disclosure may be assembler instructions, instruction-set-architecture (ISA) instructions, machine instructions, machine-related instructions, microcode, firmware instructions, state-setting data, or source code or object code written in any combination of one or more programming languages, including an object oriented programming language, such as Smalltalk, C++ or the like, and the conventional procedural programming languages, such as the "C" programming language or similar programming languages. The computer readable program instructions may be executed completely on the user's computer, partly on the user's computer, as a stand-alone software package, partly on the user's computer and partly on a remote computer, or completely on a remote computer or a server. In the scenario with remote computer, the remote computer may be connected to the user's computer through any type of network, including local area network (LAN) or wide area network (WAN), or connected to an external computer (for example, through the Internet connection from an Internet Service Provider). In some embodiments, electronic circuitry, such as programmable logic circuitry, field-programmable gate arrays (FPGA), or programmable logic arrays (PLA), may be customized from state information of the computer readable program instructions; the electronic circuitry may execute the computer readable program instructions, so as to achieve the aspects of the present disclosure.

Aspects of the present disclosure have been described herein with reference to the flowchart and/or the block diagrams of the method, device (systems), and computer program product according to the embodiments of the present disclosure. It will be appreciated that each block in the flowchart and/or the block diagram, and combinations of blocks in the flowchart and/or block diagram, can be implemented by the computer readable program instructions.

These computer readable program instructions may be provided to a processor of a general purpose computer, a dedicated computer, or other programmable data processing devices, to produce a machine, such that the instructions create means for implementing the functions/acts specified in one or more blocks in the flowchart and/or block diagram when executed by the processor of the computer or other programmable data processing devices. These computer readable program instructions may also be stored in a computer readable storage medium, wherein the instructions cause a computer, a programmable data processing device and/or other devices to function in a particular manner, such that the computer readable storage medium having instructions stored therein comprises a product that includes instructions implementing aspects of the functions/acts specified in one or more blocks in the flowchart and/or block diagram.

The computer readable program instructions may also be loaded onto a computer, other programmable data processing devices, or other devices to have a series of operational steps performed on the computer, other programmable devices or other devices, so as to produce a computer implemented process, such that the instructions executed on the computer, other programmable devices or other devices implement the functions/acts specified in one or more blocks in the flowchart and/or block diagram.

The flowcharts and block diagrams in the drawings illustrate the architecture, function, and operation that may be implemented by the system, method and computer program product according to the various embodiments of the present disclosure. In this regard, each block in the flowchart or block diagram may represent a part of a module, a program segment, or a portion of code, which comprises one or more executable instructions for implementing the specified logical function(s). In some alternative implementations, the functions denoted in the blocks may occur in an order different from that denoted in the drawings. For example, two contiguous blocks may, in fact, be executed substantially concurrently, or sometimes they may be executed in a reverse order, depending upon the functions involved. It will also be noted that each block in the block diagram and/or flowchart, and combinations of blocks in the block diagram and/or flowchart, can be implemented by dedicated hardware-based systems performing the specified functions or acts, or by combinations of dedicated hardware and computer instructions.

The computer program product may be implemented specifically by means of hardware, software, or a combination thereof. In an optional embodiment, the computer program product is embodied specifically as a computer storage medium, and in another optional embodiment, the computer program product is embodied specifically as a software product, for example, a Software Development Kit (SDK).

Although the embodiments of the present disclosure have been described above, it will be appreciated that the above descriptions are merely exemplary, but not exhaustive; and that the disclosed embodiments are not limiting. A number of variations and modifications may occur to one skilled in the art without departing from the scopes and spirits of the described embodiments. The terms in the present disclosure are selected to provide the best explanation on the principles and practical applications of the embodiments and the technical improvements to the arts on market, or to make the embodiments described herein understandable to one skilled in the art.

What is claimed is:

1. An emulation test system for flash translation layer, the system comprising a network block device, a virtual hardware accelerator, a flash translation layer module, and a virtual flash memory based on the network block device, wherein
    the network block device is configured to receive and forward test information, the test information including a write instruction and data to be written and/or a read instruction;
    the virtual hardware accelerator, connected to the network block device and the flash translation layer module, is configured to allocate the test information to each thread of the virtual hardware accelerator and perform virtual hardware acceleration on the flash translation layer module; and
    the flash translation layer module, connected to the virtual flash memory and the network block device, is configured to operate the virtual flash memory based on the test information to obtain an operation result, wherein based on the test information including the read instruction, a read operation result is returned to the network block device through the virtual hardware accelerator, or based on the test information including the write instruction, a write operation result is returned to the network block device through the flash translation layer module.

2. The system according to claim 1, wherein the network block device comprises a network block device client and a network block device server,
    the network block device client is configured to receive a test request and parse the test request to obtain the test information; and
    the network block device server is configured to, based on a type of the test information, enqueue an instruction in the test information to forward the instruction to the virtual hardware accelerator and copy the data to be written to the virtual hardware accelerator.

3. The system according to claim 1, wherein the virtual hardware accelerator and the flash translation layer module include one or more threads.

4. The system according to claim 1, wherein based on the test information including the write instruction and the data to be written, the flash translation layer module is further configured to:
    request for a storage space from the virtual flash memory;
    perform a translation from a logical address to a physical address; and
    write the data to be written to the requested storage space based on the resulted physical address and return a write operation result to the network block device.

5. The system according to claim 1, wherein based on the test information including the read instruction, the flash translation layer module is further configured to:
    perform a translation from a logical address to a physical address; and
    read data from the virtual flash memory based on the physical address resulted from the translation and return a read operation result to the virtual hardware accelerator.

6. An emulation test method for flash translation layer, comprising:
    generating a network block device, a virtual hardware accelerator, a flash translation layer module, and a virtual flash memory based on the network block device;
    receiving and forwarding test information by the network block device, the test information including a write instruction and data to be written and/or a read instruction;
    by the virtual hardware accelerator, allocating the test information to each thread of the virtual hardware accelerator and performing a virtual hardware acceleration on the flash translation layer module; and
    by the flash translation layer module, operating the virtual flash memory based on the test information to obtain an operation result, wherein based on the test information including the read instruction, a read operation result is returned to the network block device through the virtual hardware accelerator, or based on the test information including the write instruction, a write operation result is returned to the network block device through the flash translation layer module.

7. The method according to claim 6, wherein the network block device comprises a network block device client and a network block device server, the method further comprises:
    by the network block device client, receiving a test request and parsing the test request to obtain the test information; and
    by the network block device server, based on a type of the test information, enqueuing an instruction in the test information to forward the instruction to the virtual hardware accelerator and copying the data to be written to the virtual hardware accelerator.

8. The method according to claim 6, wherein based on the test information including the write instruction and the data to be written, the method further comprises performing, by the flash translation layer module, operations of:
    requesting for a storage space from the virtual flash memory;
    a translation from a logical address to a physical address; and
    writing the data to be written to the requested storage space based on the resulted physical address and returning a write operation result to the network block device.

9. The method according to claim 6, wherein based on the test information including the read instruction, the method further comprises: performing, by the flash translation layer module, operations comprising:

a translation from a logical address to a physical address; and reading data from the virtual flash memory based on the physical address resulted from the translation and returning a read operation result to the virtual hardware accelerator.

10. The method according to claim 6, wherein the virtual hardware accelerator and the flash translation layer module include one or more threads.

* * * * *